United States Patent [19]

Evans et al.

[11] 3,779,280
[45] Dec. 18, 1973

[54] CONTROL VALVE FOR CONTAMINANT-LADEN GASES

[75] Inventors: Arthur J. Evans, Northville, Mich.; Joseph C. Morin, New Westminister, British Colombia, Canada

[73] Assignee: Whitlock, Inc., Farmington, Mich.

[22] Filed: Aug. 17, 1972

[21] Appl. No.: 281,531

[52] U.S. Cl. .................................... 137/625.5
[51] Int. Cl. ............................................ F16k 11/00
[58] Field of Search .................. 137/625.5, 625.48, 137/614.21, 614.14

[56] References Cited
UNITED STATES PATENTS

| | | | |
|---|---|---|---|
| 3,043,335 | 7/1962 | Hunt | 137/596.15 |
| 3,480,041 | 11/1969 | Whitlock | 137/625.5 X |
| 2,985,424 | 5/1961 | Anderson et al. | 251/360 X |
| 2,739,613 | 3/1956 | Kulikoff | 251/359 X |
| 2,833,301 | 5/1958 | Argus | 137/614.21 X |
| 3,126,915 | 3/1964 | Hunt | 137/625.5 |
| 3,283,783 | 11/1966 | Kent | 137/625.5 X |
| 3,540,479 | 11/1970 | Thompson | 137/625.5 |

Primary Examiner—Samuel Scott
Attorney—James B. Kinzer et al.

[57] ABSTRACT

A control valve for directing the flow of gases which may contain substantial amounts of powder, granular material, or other contaminants, comprising a housing defining two transfer chambers; both chambers are connected to a central port and each chamber is connected to a separate intermediate port and to an end port. An actuator rod extending through both transfer chambers carries two pair of poppets, one pair in each transfer chamber. The poppets in each pair are slidably mounted on the rod, back-to-back, and each pair is biased away from the other poppet in the pair, toward a retainer mounted on the rod, by a spring interposed between the poppets. Each poppet is face with a frusto-conical seal of moderately soft elastomer that engages a relatively sharp valve seat in line contact to seal off one of the transfer chambers from the central port or from one of the end ports, the valve being actuated by axial movement of the actuator rod.

5 Claims, 2 Drawing Figures

PATENTED DEC 18 1973 3,779,280

1

CONTROL VALVE FOR CONTAMINANT-LADEN GASES

BACKGROUND OF THE INVENTION

In some process applications, it is necessary to control the flow of air or other gases containing substantial quantities of entrained powder material or granular material. In many of these applications, the gas may also carry substantial quantities of water vapor. One example of an application of this kind constitutes a dehumidifier and dryer system utilized to process relatively large quantities of air, in the plastics industry, as an adjunct to the transmission and processing of granular and powdered plastic materials. A system of this kind often requires changes in operating connections that can best be effected by a control valve capable of handling a rather high volume flow of gas, at moderate pressures.

Control valves used in systems of the kind discussed above present a number of difficult problems. The entrained powder and granular material tends to fall out of the stream of gas or other air passing through the valve, which may lead to jamming of the valve after only a relatively short period of operation. Jamming is particularly likely in those instances in which the air or gas contains substantial quantities of moisture as well as granular and powder materials. Previously known control valves have also tended to produce excessive pressure drops. Thus, a valve with limited or tortuous passageways can produce an undesirable head loss that may interfere with the effective operation of the system in which the valve is incorporated.

Effective maintenance of seals, in control valves of the kind described, may also present substantial problems. Because the valves are utilized to control air and other gases, precise machining of mating surfaces and relatively expensive seals may be required, both of which may suffer substantially from the entrained powder or granular materials in the gas. Maintenance problems are often difficult. Furthermore, valves of this kind are frequently required to operate under conditions of substantial thermal variation, affording further difficulties in maintaining a sealed and effective control action.

SUMMARY OF THE INVENTION

It is a principal object of the present invention, therefore, to provide a new and improved control valve for controlling and directing the flow of gases which may contain substantial entrained quantities of powdered solids or granular solids, at moderate pressures and at high flow rates, that is inherently self-cleaning in its operation and capable of long sustained life with only minimal maintenance.

A related object of the invention is to provide a new and improved control valve capable of long term operation when employed in conjunction with gases which may contain considerable amounts of water vapor as well as powdered and granular solids.

A specific object of the invention is to provide a new and improved control valve for highly contaminated gases, operating at moderate pressure and at a high flow rate, which provides relatively short unobstructed passageways and induces only a minimal pressure drop when operating at moderate pressures.

A particular object of the invention is to provide a new and improved control valve for highly contaminated gases that is effectively and inherently self-compensating for wear and that is capable of uninterrupted operation over a wide temperature range without requiring any mechanical adjustment or other change in the valve.

Accordingly, the present invention relates to a control valve for controlling and directing the flow of gases which may contain substantial entrained quantities of moisture, powdered solids, and granular solids, at moderate pressures and at high flow rates. A control valve constructed in accordance with the invention comprises a housing enclosing a transfer chamber, a first external port connected to the transfer chamber through a first valve port having a valve seat facing inwardly of one end of the transfer chamber, a second external port connected to the transfer chamber through a second valve port having a valve seat facing inwardly of the opposite end of the transfer chamber, and a third external port connected to the transfer chamber intermediate the first and second valve ports. An actuator rod extends axially through the first and second valve ports and through the transfer chamber; a first poppet and a second poppet are mounted in back-to-back relation on the actuator rod with the first poppet facing the first valve seat and the second poppet facing the second valve seat. First and second retainers are mounted on the actuator rod to limit movement of the poppets toward their associated valve seats. Resilient biasing means are provided to bias the two poppets toward their respective retainers. In the preferred construction, the poppets are both slidable on the actuator valve and the biasing means comprises a single spring interposed between the two poppets. The control valve further includes actuating means for moving the actuator rod axially between a first position, in which the first valve port is closed by the first poppet engaging the first valve seat, and a second position, in which the second valve port is closed by the second poppet engaging the second valve seat.

DESCRIPTION OF THE PREFERRED EMBODIMENT

Figure 1:
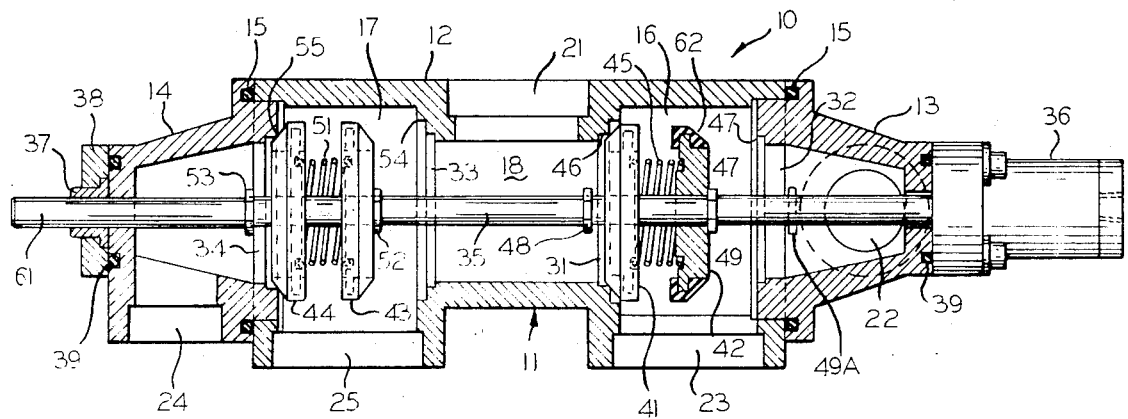
FIG. 1 is a longitudinal sectional view of a control valve constructed in accordance with a preferred embodiment of the present invention.

FIG. 1 illustrates a control valve 10, constructed in accordance with a preferred embodiment of the present invention, suitable for use in controlling and directing the flow of gases which may contain substantial entrained quantities of moisture, powdered solids, and granular solids, at moderate pressures and at high flow rates. Valve 10 comprises a housing 11 including a central valve body 12 and two end caps 13 and 14. The end caps 13 and 14 may be mounted upon the central valve body 12 by any suitable means (not shown); for example, valve body 12 and end caps 13 and 14 may be provided with mating flanges for receiving bolts to secure the end caps on the valve body. Appropriate O-ring seals 15 are provided for the two end caps 13 and 14. Body 12 and end caps 13 and 14 may be formed of metal, as shown, but other relatively hard, rigid and durable materials, such as polyvinyl chloride, can be used if desired.

Valve housing 11 defines a first transfer chamber 16, located in the right-hand portion of the housing as seen in FIG. 1; a second similar transfer chamber 17 is located in the left-hand portion of the valve housing. A first external port 21 for valve 10 is formed in the body 12 that constitutes the central portion of valve housing 11. This first external port 21 is connected, through a central chamber 18 and a first valve port 31, to one end of the first transfer chamber 16. A second external port 22, formed in end cap 13, is connected to the opposite end of the first transfer chamber 16 through a second valve port 32. A third external port 23 is formed in housing 11 and connects directly to transfer chamber 16, intermediate the first and second valve ports 21 and 22.

The valve structure associated with the second transfer chamber 17 is essentially similar to that for the first transfer chamber 16. Thus, the first external port 21 is connected to one end of the second transfer chamber 17 through the central chamber 18 and through a third valve port 33. A fourth external port 24 is formed in end cap 14 and is connected to the opposite end of the second transfer chamber 17 through a fourth valve port 34. A fifth external port 25, formed in the central body 12 of valve housing 11, communicates directly with the second transfer chamber 17.

Control valve 10 further comprises an actuator rod 35 that extends axially through the entire housing 11 of the control valve. Thus, actuator rod 35, starting from its right-hand end as seen in FIG. 1, extends axially through the internal valve port 32, the first transfer chamber 16, the internal valve port 31, the central chamber 18, the internal valve port 33, the second transfer chamber 17, and the internal valve port 34. The right-hand end of actuator rod 35 projects through an aperture in the end wall of cap 13 and is connected to an actuator device 36.

The actuator device 36 may comprise a pneumatically or hydraulically operated actuating mechanism or may constitute a solenoid operated actuating mechanism. In one commercial construction, actuating device 36 constitutes a double-acting hydraulic cylinder having an overall stroke of approximately 0.75 inch. The left-hand end of actuator rod 35, as seen in FIG. 1, extends through an aperture in the end wall of cap 14 and through a bearing 37 mounted on cap 14 by a bearing cap 38. O-ring seals 39 may be provided for the mounting of the actuating device 36 and the bearing cap 38 on the housing caps 13 and 14 respectively.

Within the first transfer chamber 16, a first poppet 41 and a second poppet 42 are slidably mounted in back-to-back relation on actuator rod 35. A coil spring 45 is interposed between poppets 41 and 42, biasing poppet 41 toward a relatively sharp annular rim 46 that encircles the first valve port 31 and that constitutes a valve seat facing inwardly of the first transfer chamber 16. Typically, valve seat 46 may have a corner radius of 1/32 inch or less. Similarly, spring 45 urges the second poppet 42 toward engagement with a sharp annular rim 47 that affords an annular valve seat for the second valve port 32, facing inwardly of transfer chamber 16. A first retainer 48 is mounted upon actuator rod 35 to limit movement of the first poppet 41 along the actuator rod toward the first valve seat 46. A similar second retainer 49 is mounted upon actuator rod 35 to limit sliding movement of the second poppet 42 toward the valve seat 47 of the second valve port 42. Each of the two retainers 48 and 49 may comprise a conventional retainer ring mounted in a slot in the actuator rod.

A similar construction is employed in the second transfer chamber 17. Thus, a third poppet 43 and a fourth poppet 44 are slidably mounted upon actuator rod 35, within chamber 17, in back-to-back relation. A coil spring 51 is mounted between the poppets 43 and 44 and biases the two poppets outwardly toward engagement with a pair of retainers 52 and 53, respectively, that are mounted upon actuator rod 35. The third poppet 43 faces a relatively sharp annular valve seat 54 encircling the third valve port 33. The fourth poppet 44 faces a similar annular valve seat 55 that is a part of the fourth valve port 34; both of the valve seats 54 and 55 face inwardly of the second transfer chamber 17.

Control valve 10 has two distinct operating positions, the transition between the two operating positions being effected by axial movement of actuator rod 35 effected by the actuating means comprising device 36. In FIG. 1, valve 10 is shown in a first operating position in which actuator rod 35 is extended fully to the left, as seen in the drawing. For this operating condition, the first poppet 41 engages the first valve seat 46 in a line seal contact, closing the first external port 21 from access to the second and third external ports 22 and 23. For this operating condition, retainer 49 maintains the second poppet 42 well clear of the valve seat 47 for the second valve port 32, so that there is open and unimpeded communication between the external ports 22 and 23.

For the same operating position of control valve 10, the fourth poppet 44 engages valve seat 55 of the fourth valve port 34 and thus closes the fourth external port 24 from access to transfer chamber 17 and hence from access to either of the external ports 21 and 25. At the same time, retainer 52 maintains the third poppet 43 clear of the valve seat 54 of the third valve port 33, so that there is clear and unimpeded communication between the first external port 21 and the fifth external port 25 of the valve.

To change valve 10 to its second operating condition, device 36 is energized and pulls actuator rod 35 to the right. The movement of the actuator rod 35 is sufficient to move retainer 49 completely through valve port 32 to the position indicated by the dash outline 49A. As will be apparent from FIG. 1, the same movement is sufficient to remove retainer 52 completely through the third valve port 33.

In the second operating position for control valve 10, the second poppet 42 engages the valve seat 47 of the second valve port 32 in line sealing contact and closes the second external port 22 from access to transfer chamber 16 and hence from access to either of the first and third external ports 21 and 23. For this position of the control valve, the first retainer 48, which has been moved into the interior of transfer chamber 16, maintains poppet 41 clear of the valve seat 46 for the first valve port 31, so that the first and third external ports 21 and 23 are in direct and unimpeded communication through valve port 31 and transfer chamber 16.

For the second operating position of control valve 10, as described above, a similar change takes place in transfer chamber 17. That is, the third poppet 43 comes into line sealing contact with the valve seat 54 of the third valve port 33, closing off the first external port 21 from access to transfer chamber 17 and hence from access to either of the fourth and fifth external ports 24 and 25. The fourth retainer 53, having moved well into the interior of transfer chamber 17, maintains the fourth poppet 44 clear of valve seat 55 so that the fourth and fifth external ports 24 and 25 are in direct and unimpeded communication with each other through transfer chamber 17.

To achieve an effective line seal at each of the internal valve ports 31, 32, 33 and 34, each of the poppets 41-44 is provided with a seal element of frustoconical configuration. This construction is best illustrated by poppet 42, which is shown in cross section. The seal element 62 of poppet 42 is formed of moderately soft elastomer material that will not deteriorate from contact with the gas passing through the valve or from the contaminants carried by the gas. Materials suitable for many applications include neoprene, Buna-N, and EPT elastomers. The hardness of seal element 62 is important; a seal element that is too hard will not afford an adequate gas-tight seal, whereas a seal element that is too soft will deform excessively and will break down after limited life. Seal elements of forty to eighty durometer hardness are satisfactory.

Seal element 62, as shown, is of frusto-conical configuration so that, when it engages valve seat 47, a line-contact seal is formed. A similar construction is used for each of the other poppets. The configurations and constructions for the poppets and their mating valve seats could be reversed, with a sharp rim formed on each poppet and a frusto-conical seal element of moderately soft elastomer constituting the valve seat of each valve port. The illustrated construction is preferred, however, for easier replacement of the elastomer seal elements if this proves necessary after a long term of use.

The resilient construction used for the poppet assemblies in each of the transfer chambers 16 and 17 is of substantial importance in assuring continued and effective operating life for control valve 10. In the operating position shown in FIG. 1, spring 45 affords an effective biasing means that maintains the first poppet 41 in firm line seal contact with its mating valve seat 46 despite any minor eccentricities in the seal element of the poppet or in seat 46. Any entrained granular material in the gas flowing through the valve that tends to accumulate on the surface of poppet 41 when valve port 31 is open tends to be scraped off when poppet 41 closes on valve seat 46. If some of the granular or powder material remains on the surface of the elastomer seal element that constitutes the working surface of the poppet, the resilience of the elastomer and the resilient bias afforded by spring 45 assure an effective sealing contact. This applies equally to all of the poppets and their mating valve seats; it is thus seen that control valve 10 is inherently self-cleaning and is capable of an effective sealing operation even when required to control air or other gases carrying relatively heavy quantities of contaminant material.

Valve 10 may be utilized to control gases that may vary substantially in temperature. Misalignment caused by differential expansion of the poppets or of the valve housing has no appreciable effect upon the sealing efficiency of the valve, due to the complete resilient construction of the valve mechanism. The overall in-line valve construction avoids any necessity for tortuous passages; the communication between external ports of the valve is effected through direct, wide passages that afford minimum interference with movement of gas through the valve. Pressure losses in the valve are quite low, as compared with previously known devices, maintaining a high overall efficiency for the control valve. Nevertheless, valve 10 is quite simple and inexpensive in construction. It is capable of sustained operation over long periods of time with virtually no maintenance, maintaining effective seals at its internal valve ports at all times.

Actuator rod 35 also performs an auxiliary function. For one operating position of valve 10, as shown in FIG. 1, the left-hand end 61 of rod 35 projects outwardly of the bearing 37 at the end of the valve housing. For the alternate operating position, described above, the outer end 61 of actuator rod 35 is retracted within bearing 37. Thus, it is a simple matter to identify the present operating position of valve 10 by observation of the rod end 61, which always affords a clear indication of the operating condition.

Figure 2:
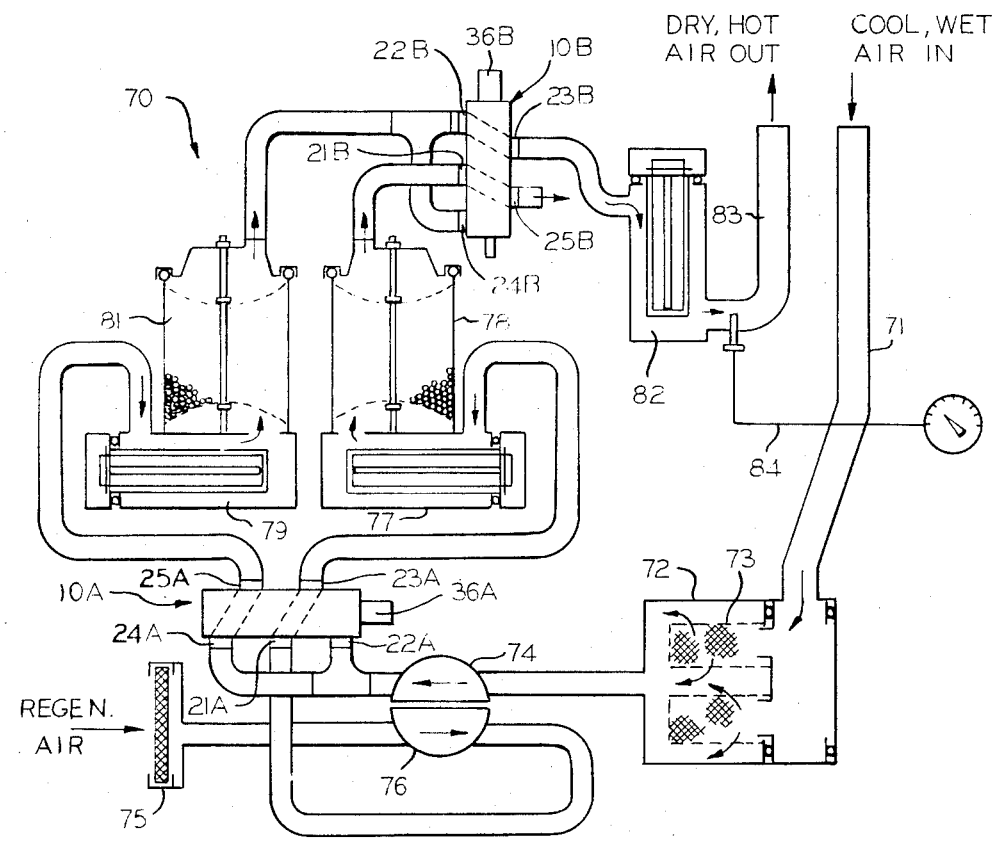
FIG. 2 is a schematic diagram of a dehumidifying closed loop dryer that utilizes two control valves constructed in accordance with the invention.

FIG. 2 is a schematic illustration of a typical application in which valves like control valve 10 (FIG. 1) may be employed. FIG. 2 is a process flow schematic for a dehumidifying closed loop dryer employed for air drying, usually in equipment utilized in the plastics molding industry.

Drying system 70, as illustrated in FIG. 2, comprises a re-cycling inlet conduit 71 connected to a filter installation 72 that includes a plurality of external filter socks 73. The outlet of filter 72 is connected to a process blower 74. The outlet of blower 74 is connected to the second and fourth external ports 22A and 24A of a control valve 10A corresponding in construction to control valve 10 of FIG. 1.

Drying system 70 further comprises a regeneration air intake beginning with a filter 75 that takes its air supply directly from the atmosphere and that is connected to the inlet of a blower 76. Blower 76 is connected to the central external port 21A of control valve 10A. One of the intermediate external ports 23A of valve 10A is connected to the inlet of a regeneration heater 77. Heater 77 is connected to the inlet of a desiccant bed 78. The desiccant bed 78 has an outlet that is connected to the central external port 21B of a second control valve 10B that also corresponds in construction to the control valve 10 of FIG. 1.

The remaining external port 25A of control valve 10A, in FIG. 2, is connected to a regeneration air heater 79. The outlet of heater 79 is connected to a desiccant bed 81 having an outlet that is connected to the external end ports 22B and 24B of control valve 10B.

One of the intermediate external ports 25B of control valve 10B is vented to the atmosphere. The other intermediate external port 23B of valve 10B is connected to the inlet of a process air heater 82 having an outlet conduit 83. The outlet conduit 83 is connected to a plenum (not shown) employed to supply hot dry air for process purposes, the conduit 71 being connected to the outlet of the same plenum.

In the drying system 70, each of the control valves 10A and 10B functions as a four-way valve. For the illustrated positions of the valves, cool wet air is drawn into the system through inlet 71 and filter 72 by blower 74. From blower 74, the wet air is supplied to ports 22A and 24A of control valve 10A. Port 22A is blocked, but port 24A is in communication with port 25A, so that the moist air is supplied to heater 79 and thence to desiccant bed 81. From bed 81, the air is supplied to ports 22B and 24B of control valve 10B. Port 24B is closed but port 22B is in communication with port 23B so that the air, which has now been dried, is transferred to heater 82 and thence to the system outlet 83.

For the illustrated operating condition of system 70, air is also drawn through filter 75 by blower 76 and supplied to port 21A of valve 10A. The air passes through valve 10A to port 23A and thence through heater 77 and drying bed 78 to port 21B of valve 10B. This air is bled off through port 25B of control valve 10B.

Under given operating conditions, it may be desirable to change from air recirculation to the use of regeneration air. One means by which this may be accomplished is to actuate valve 10B from the illustrated operating condition, which corresponds to the operating condition of valve 10 as shown in FIG. 1, to its second operating position. By actuating valve 10B to its alternate operating position, port 22B is blocked, port 21B is connected to port 23B, and port 24B is connected to port 25B. With this change in the system, the regeneration air from desiccant bed 78 is supplied to heater 82 and outlet 83 instead of using the recirculating air from desiccant bed 81.

It may also be desirable to change from desiccant bed 81 to bed 78, with respect to the processing of the recirculating air entering the system through filter 72. This is accomplished by means of control valve 10A, energizing the actuating device 36A to change valve 10A from the illustrated operating condition to the operating condition shown in FIG. 1. When this is done, port 24A is closed, port 21A is connected to port 25A and port 22A is connected to port 23A. This passes the returning air from filter 72 and blower 74 into the inlet of heater 77 and desiccant bed 78 and at the same time diverts the regeneration air supply to heater 79 and drying bed 81.

In a typical commercial installation corresponding to drying system 70, blower 74 may have an operating capacity of one hundred cubic feet per minute. The regeneration blower 76 may be somewhat smaller, with a typical capacity of about thirty cubic feet per minute. For normal operation, the supply of air to the outlet 83 may be at a rate of ninety-five cubic feet per minute at a pressure of one pound per square inch gauge. The temperature of the air supplied by the system may be adjusted over a wide range by an appropriate control schematically illustrated by the control 84.

We claim:

1. A control valve for controlling and directing the flow of gases which may contain substantial entrained quantities of moisture, powdered solids, and granular solids, at moderate pressures and at high flow rates, comprising:

a housing enclosing first and second axially aligned transfer chambers;

a first external port connected to the first transfer chamber through a first valve port having a valve seat facing inwardly of one end of the first transfer chamber;

a second external port connected to the first transfer chamber through a second valve port having a valve seat facing inwardly of the opposite end of the first transfer chamber;

a third external port connected to the first transfer chamber intermediate the first and second valve ports;

a third valve port connecting the first external port to the second transfer chamber and having a valve seat facing inwardly of one end of the second transfer chamber;

a fourth external port connected to the second transfer chamber through a fourth valve port having a valve seat facing inwardly of the opposite end of the second transfer chamber;

a fifth external port connected to the second transfer chamber intermediate the third and fourth valve ports;

an actuator rod extending axially through the first, second, third and fourth valve ports and through both of the transfer chambers;

a first poppet and a second poppet mounted in back-to-back relation on the actuator rod within the first chamber, the first poppet facing the first valve seat and the second poppet facing the second valve seat;

a first retainer, mounted on the actuator rod, for limiting movement of the first poppet along the rod toward the first valve seat;

a second retainer, mounted on the actuator rod, for limiting movement of the second poppet along the rod toward the second valve seat;

first resilient biasing means biasing the first and second poppets toward their respective retainers;

a third poppet and a fourth poppet slidably mounted in back-to-back relation on the actuator rod within the second chamber, the third poppet facing the third valve seat and the fourth poppet facing the fourth valve seat;

a third retainer, mounted on the actuator rod, for limiting movement of the third poppet along the rod toward the third valve seat;

a fourth retainer, mounted on the actuator rod, for limiting movement of the fourth poppet along the rod toward the fourth valve seat;

second resilient biasing means biasing the third and fourth poppets toward their respective retainers;

and actuating means for moving the actuator rod axially between a first position, in which the first poppet engages the first valve seat and closes the first external port from access to the second and third external ports while the second retainer maintains the second poppet clear of the second valve seat so that the second and third external ports are in communication, and the fourth poppet engages the fourth valve seat and closes the fourth external port from access to the first and fifth external ports while the third retainer maintains the third poppet clear of the third valve seat so that the first and fifth external ports are in communication, and a second position in which the second poppet engages the second valve seat and closes the second external port from access to the first and third external ports while the first retainer maintains the first poppet clear of the first valve seat so that the first and third external ports are in communication, and the third poppet engages the third valve seat and closes the first external port from access to the fourth and fifth external ports while the fourth retainer maintains the fourth poppet clear of the fourth valve seat so that the fourth and fifth external ports are in communication.

2. A control valve according to claim 1 in which the actuator extends through the complete housing and projects outwardly of one end of the housing to afford an indication of the current operating position of the rod.

3. A control valve according to claim 1, in which each poppet is axially slidably movable along the actuator rod and in which each poppet and valve seat combination includes a seal element of frusto-conical configuration formed of moderately soft elastomer material and a relatively sharp, hard seal rim that engages and indents the seal element in a line-contact seal.

4. A control valve according to claim 3 in which, in each poppet and valve seat combination, the seal element is a part of the poppet and the seal rim comprises the valve seat.

5. A control valve according to claim 3, in which the first resilient biasing means comprises a spring interposed between the first and second poppets and in which the second resilient biasing means comprises a spring interposed between the third and fourth poppets.

* * * * *